United States Patent
Loos

[15] 3,658,113
[45] Apr. 25, 1972

[54] PROTECTIVE COVER FOR THE BED OF MACHINE TOOLS

[72] Inventor: Kurt Loos, Dreis-Tiefenbach, Germany

[73] Assignee: Kabelschlepp Gesellschaft mit beschrankter Haftung, Siegen, Germany

[22] Filed: June 24, 1970

[21] Appl. No.: 49,346

[30] Foreign Application Priority Data

June 27, 1969 Germany .................... P 19 32 555.4

[52] U.S. Cl. .............................. 160/202, 160/222, 308/3.5
[51] Int. Cl. ......................................................... E05d 15/06
[58] Field of Search ............... 308/3.8, 3.5, 6; 312/301, 319, 312/348; 108/93; 90/58; 160/202, 222, 223, 197

[56] References Cited

UNITED STATES PATENTS 3,565,153   2/1971   Loos .................................... 160/202

Primary Examiner—Martin P. Schwadron
Assistant Examiner—Ronald H. Lazarus
Attorney—Walter Becker

[57] ABSTRACT

A protective cover for guiding paths of machine tools which comprises a plurality of overlapping cover members arranged to telescope into and out of each other from one end position through an intermediate range into another end position and vice versa, in which energy storing means are interposed between adjacent cooperating energy storing means and are acted upon to store energy only when the respective cooperating cover members are outside said intermediate range.

2 Claims, 3 Drawing Figures

PATENTED APR 25 1972

3,658,113

INVENTOR.
Kurt Loos
BY

PROTECTIVE COVER FOR THE BED OF MACHINE TOOLS

The present invention relates to a protective cover for guiding paths of machine tools, which comprises a plurality of cover members or plates overlapping each other and adapted telescopically to be moved one into the other. Each cover member has its front end wall provided with supporting means such as rollers or skids for movement on the guiding path whereas the rear end of the respective cover member rests on the respective adjacent next smaller cover member. Between the cover members there are arranged energy storage means which in the end positions of the cover, i.e., in the pushed together or pulled apart position of said cover members, are adapted to release the stored energy as return energy for returning said cover members from said end positions.

Heretofore known protective covers of the general type set forth above, however, have the drawback that the cover members are continuously in engagement with each other through the said energy storing means. If, e.g., the carriage is to be moved by a distance only which is shorter than the push-in length of the adjacent cover member into the next following cover member, it would fully suffice that the carriage displaces only the cover member adjacent thereto and at a maximum the next following cover member, but it is not necessary to displace all cover plates as is the case with the above mentioned heretofore known protective cover arrangement due to the fact that all cover members are continuously interconnected. Therefore with this heretofore known protective cover arrangement, some cover members are moved unnecessarily under the above conditions, and driving energy is unnecessarily consumed.

It is, therefore, an object of this invention to provide a protective cover for a guiding path of a machine tool which will overcome the above mentioned drawbacks while retaining the advantages inherent to the provision of energy storing means between adjacent cover members.

These and other objects and advantages of the invention will appear more clearly from the following specification in connection with the accompanying drawing, in which:

FIG. 2 is a view similar to FIG. 1 but shows the cover fully contracted or pushed in;

Figure 1:
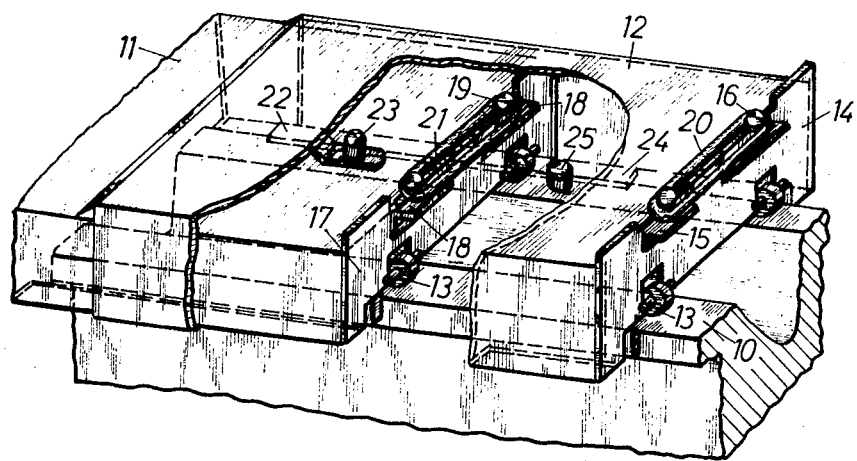
FIG. 1 is a fragmentary isometric view of part of a protective cover in accordance with the invention, the sections of the cover being located in a mid-way position.

The protective cover according to the present invention is characterized primarily in that the energy storing means start storing returning energy only when the respective adjacent and cooperating cover members have left their relative intermediate position while the adjacent cooperating cover members within the range of their intermediate position are freely displaceable, i.e., without acting upon said energy storing means. Thus, within the medium range between the above mentioned end positions the carriage does not have to furnish additional energy for actuating the energy storing means. The finding underlying the present invention consists in that within said intermediate range, the driving force furnished by the carriage needs far less help from the energy storing means than within the range of the said two end positions. For this range, however, the advantageous effect of the energy storing means has been retained.

As shown in the drawings, the cover comprises telescopic sections 11 and 12, mounted for movement along a guiding path 10 of a machine tool. The front end portion of the sections are mounted on rollers, slides, or other support members 13, while the rear end portions of the sections are supported by the adjacent smaller section. Thus, in the embodiment illustrated, the rear end portion of the section 12 is supported by the section 11. Brackets 15, carrying a pair of vertically extending retaining pins 16, are mounted on the front end face 14 of the section 12. Similarly, the front end face 17 of the section 11 carries brackets 18 with retaining pins 19. Elastic bands 20 and 21 are fitted around the pairs of pins 16 and 19 respectively, and extend substantially at right angles to the direction of movement of the sections.

Mounted on the underside of the section 12 and spaced apart by a predetermined distance in the direction of movement of the sections 11 and 12 is a first bracket 22, which carries an abutment 23, and second bracket 24, which carries an abutment 25. The abutments 23 and 25 are located in the same plane as the elastic bands. In the position shown in FIG. 1, the sections 11 and 12 are located mid-way in their movement in relation to each other. The elastic band 21 is disposed mid-way between the abutments 23 and 25 carried by the section 12, which is free to move about this mid-point, in relation to the section 11, through a distance equal to the spacing between the abutments 23 and 25.

Figure 2:
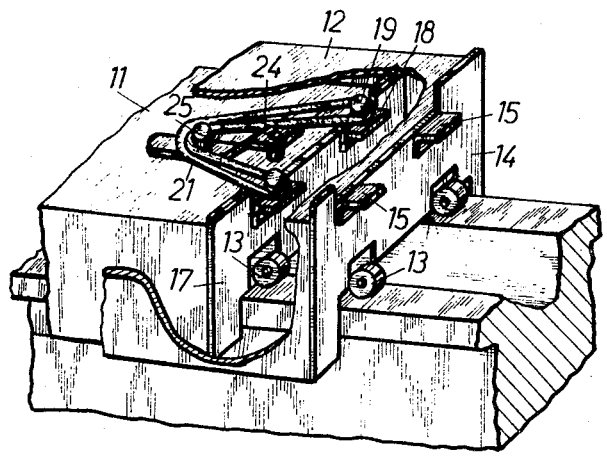

FIG. 2 shows the sections 11 and 12 in their pushed together position. In this position the abutment engages and stretches the elastic band 21, so that the stressing energy of the latter provides a restoring force to bias the sections 11 and 12 in a sense to expand the cover.

IN FIG. 2, the retaining pins 16 mounted on the brackets 15 to carry the elastic band 20 have not been shown, since the adjacent overlapping section, which fits over the section 12, has also been omitted from the drawings; the stop carried by the adjacent overlapping section will serve to stretch the elastic band 20 in the same way that the elastic band 21 has been stretched by the abutment 25.

Figure 3:
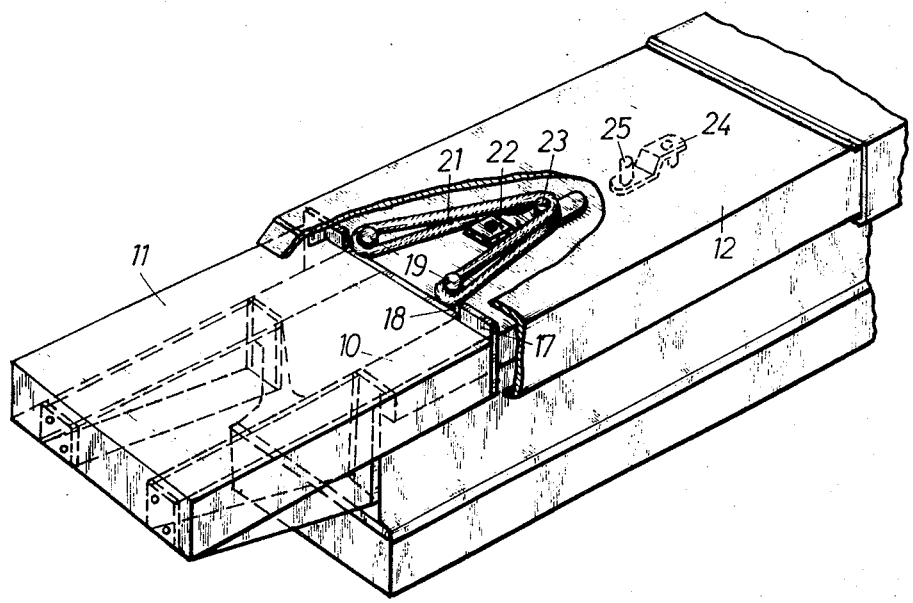
FIG. 3 is a view similar to FIG. 1, but shows the cover fully pulled apart.

As shown in FIG. 3, the sections 11 and 12 are in the fully moved-out position. As is clearly shown, the abutment 23 has engaged the elastic band 21 and has stretched it in the reverse sense to that shown in FIG. 2. The energy stored in the elastic band 21 serves to bias the sections 11 and 12 in a sense to move the cover members together. The position where the abutment 23 disengages from the elastic band 21 represents the start of the mid-way range of travel, in which relative movement between the sections 11 and 12 takes place without stretching the elastic bands.

Thus in the protective cover described herein the elastic band is stretched to provide a restoring force only when the sections come within a given distance of their extreme expanded or contracted positions, whereas the sections can move freely without bias over a portion of their travel generally mid-way between the extreme positions since there is no need to bias the sections over this portion of their travel.

It is, of course, to be understood that the present invention is, by no means, limited to the specific showing in the drawings but also comprises any modifications within the scope of the appended claims.

What I claim is:

1. In combination with a guiding path of a machine tool, a protective cover which includes: a plurality of cover members successively increasing in size from one end of the cover to the other end thereof and telescopically movable into and out of each other from one end position in which the cover members are fully pulled apart into a second end position in which the cover members are fully moved into each other, and vice versa, through an intermediate range in which the cover members are pushed only partly into each other; each of said cover members comprising supporting means arranged at one end of the cover member and movably supporting the same on said guiding path; the other end of each cover member resting on the respective adjacent smaller size cover member; energy storing means respectively supported by said cover members; and control means for cooperation with said energy storing means so as to load the latter outside said intermediate range to store energy for use in connection with the return of the respective two cooperating cover members from a position outside said intermediate range toward the latter; each two adjacent cooperating cover members being freely movable relative to each other throughout said intermediate range in which the pertaining energy storing means is ineffective, said energy storing means including elastic bands extending under preload in a direction transverse to the direction of movement of said cover members.

2. In combination with a guiding path of a machine tool, a protective cover which includes: a plurality of cover members successively increasing in size from one end of the cover to the other end thereof and telescopically movable into and out of each other from one end position in which the cover members are fully pulled apart into a second end position in which the cover members are fully moved into each other, and vice versa, through an intermediate range in which the cover members are pushed only partly into each other; each of said cover members comprising supporting means arranged at one end of the cover member and movably supporting the same on said guiding path; the other end of each cover member resting on the respective adjacent smaller size cover member; energy storing means respectively supported by said cover members; and control means for cooperation with said energy storing means so as to load the latter outside said intermediate range to store energy for use in connection with the return of the respective two cooperating cover members from a position outside said intermediate range toward the latter; each two adjacent cooperating cover members being freely movable relative to each other throughout said intermediate range in which the pertaining energy storing means is ineffective, said energy storing means including pairs of spaced holding members respectively arranged at one end portion of each cover member so that the connecting line between the holding members of each cover member extends transverse to the direction of movement of said cover members and also including elastically yieldable band means respectively supported by and extending between the holding members of each pair of said holding members, and said control means including pairs of abutment means respectively operatively associated with each two cooperating cover members which are adjacent to each other, the abutment means of each pair being arranged on opposite sides of the pertaining elastically yieldable band means when the respective two cooperating cover members are in said intermediate range, the arrangement being such that the abutment means of each pair of abutment means is supported by the respective larger cover member of the respective two cooperating cover members which are adjacent to each other, said abutment means being located in the path of movement of said band means when said cooperating cover members move from said intermediate range to either one of said end positions to thereby energy loading said last mentioned band means.

* * * * *